United States Patent [19]
Hodges

[11] Patent Number: 5,752,706
[45] Date of Patent: May 19, 1998

[54] ADJUSTABLE TOOL HOLDER FOR MACHINE TOOLS

[76] Inventor: Lyndon W. Hodges, 301 SE. 12th st., Aledo, Ill. 61231

[21] Appl. No.: 683,280

[22] Filed: Jul. 18, 1996

[51] Int. Cl.⁶ .................................................. B23B 31/36
[52] U.S. Cl. ........................... 279/16; 279/6; 279/20
[58] Field of Search ........................ 279/5, 6, 16, 20

[56] References Cited

U.S. PATENT DOCUMENTS

| | | | |
|---|---|---|---|
| 1,308,681 | 7/1919 | Prideux | 279/16 |
| 2,392,039 | 1/1946 | Gideon | 279/16 |
| 2,511,884 | 6/1950 | Thomas | 279/6 |
| 2,532,058 | 11/1950 | Clark | 279/16 |
| 2,833,544 | 5/1958 | Blades | 279/6 |
| 3,544,117 | 12/1970 | Blagham | 279/6 |
| 3,962,937 | 6/1976 | Miller | 279/6 |
| 4,570,952 | 2/1986 | Heimbigner et al. | 279/20 |
| 4,589,805 | 5/1986 | Duffner | 279/5 |
| 4,677,885 | 7/1987 | Schmid et al. | 82/40 R |
| 5,259,156 | 11/1993 | Ronen | 51/50 R |

FOREIGN PATENT DOCUMENTS

| | | |
|---|---|---|
| 64173 | 10/1981 | Israel. |
| 85515 | 2/1988 | Israel. |
| 93515 | 2/1990 | Israel. |

*Primary Examiner*—Steven C. Bishop
*Attorney, Agent, or Firm*—Henderson & Sturm

[57] ABSTRACT

A tool holder for machine tools which provides for both angular and radial alignment of the tool with respect to the working axis of the machine. A tool chuck is part of a ball and socket unit, with the ball being pivotable within the socket for angular alignment of the tool chuck and tool carried therein. The base of the socket member is movably carried within a cup-shaped housing of a base member which allows for adjustment in the vertical plane and radial alignment.

6 Claims, 3 Drawing Sheets

ADJUSTABLE TOOL HOLDER FOR MACHINE TOOLS

TECHNICAL FIELD

This invention relates to metal working lathes and other machine tools, and more particularly to a tool holder which can be adjusted to compensate for angular and radial misalignment of the axis of the tool with respect to the working axis of the machine.

BACKGROUND ART

In the operation of machine tools, precision work requires highly accurate alignment of the tool and the workpiece upon which the tool is working. For example, if a precise bore is to be drilled along the central axis of a workpiece rotated in a lathe, the axis of the drill bit must be in both angular and radial alignment with the axis of the workpiece. Slight misalignment in either aspect will result in an improper bore being drilled and often produce a broken drill bit. Since machine tools are subject to wear and settling with a resulting movement or shifting of components, a means for alignment of the axis of the tool holder and tool with respect to the axis of the machine is necessary.

DISCLOSURE OF THE INVENTION

The present invention discloses a tool holder for machine tools which provides for both angular and radial alignment of the tool with respect to the working axis of the machine. A tool chuck is part of a ball and socket unit, with the ball being pivotable within the socket for angular alignment of the tool chuck and tool carried therein. The base of the socket member is movably carried within a cup-shaped housing of a base member which allows for adjustment in the vertical plane and radial alignment.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
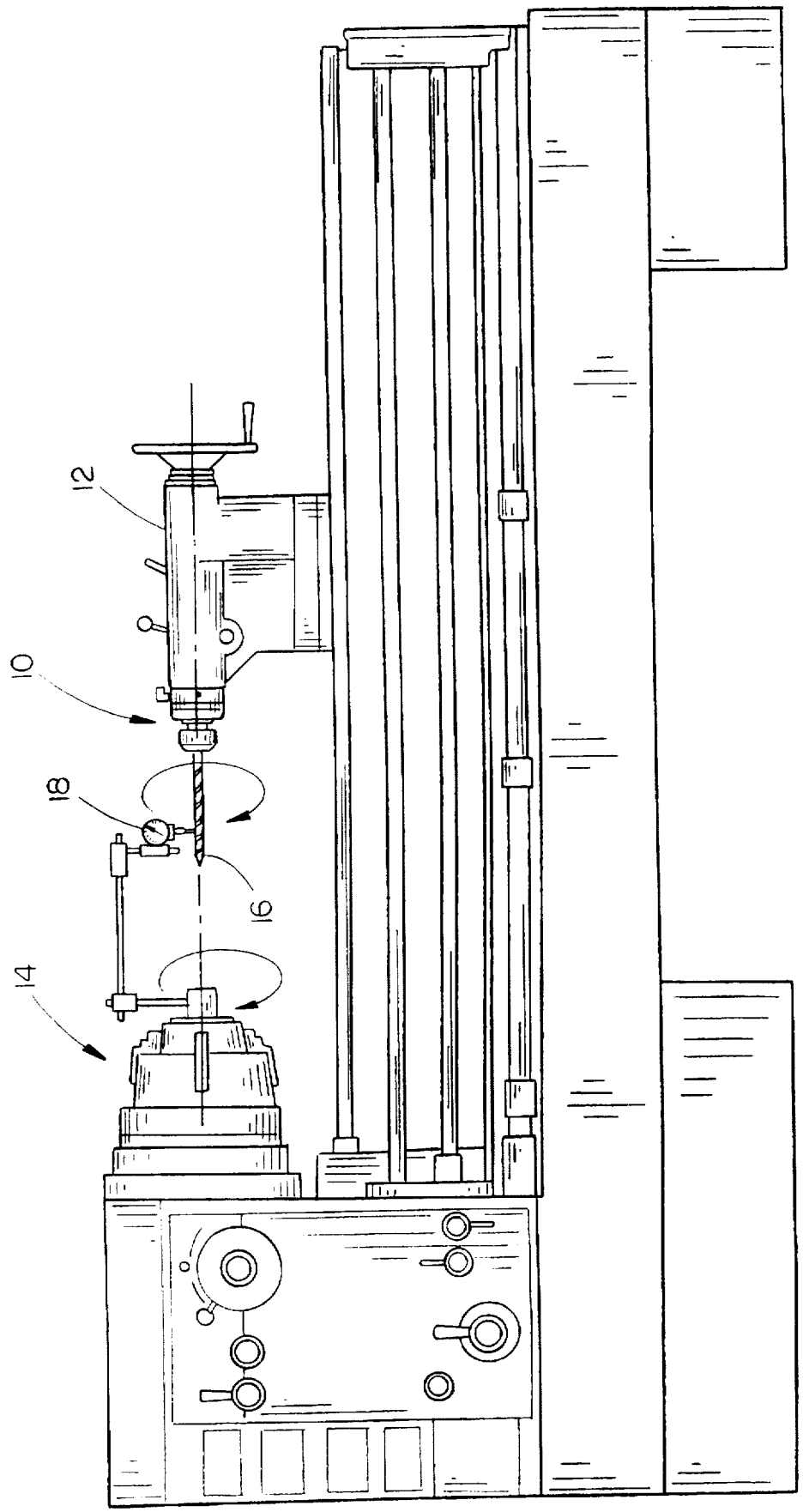
FIG. 1 is a side elevational view of a machine tool utilizing the present invention.

Referring now to the drawings, wherein like reference numerals designate identical or corresponding parts throughout the several views, the invention is designated at 10 in FIG. 1 where it is shown secured within a tailstock 12 of a metal working lathe 14. The invention is equally useful in Computerized Numerical Control lathes where it is installed in the turret. In this particular instance, which is for illustration only, the invention 10 is carrying a hardened drill bit 16 for boring a hole in a workpiece to be turned by the lathe 14. With modern hardened drill bits, angular and radial alignment of the drill bit with the workpiece is critical not only for precision work, but also to prevent breaking of these very expensive bits. To that end, as depicted in FIG. 1, a dial indicator 18 may be mounted on the lathe 14 such that it may be turned about the drill bit 16 to assess angular and radial misalignment of the bit 16 with respect to the axis of the lathe 14. Any noted misalignment may then be corrected quickly and easily using the invention 10 as will be described below.

Figure 2:
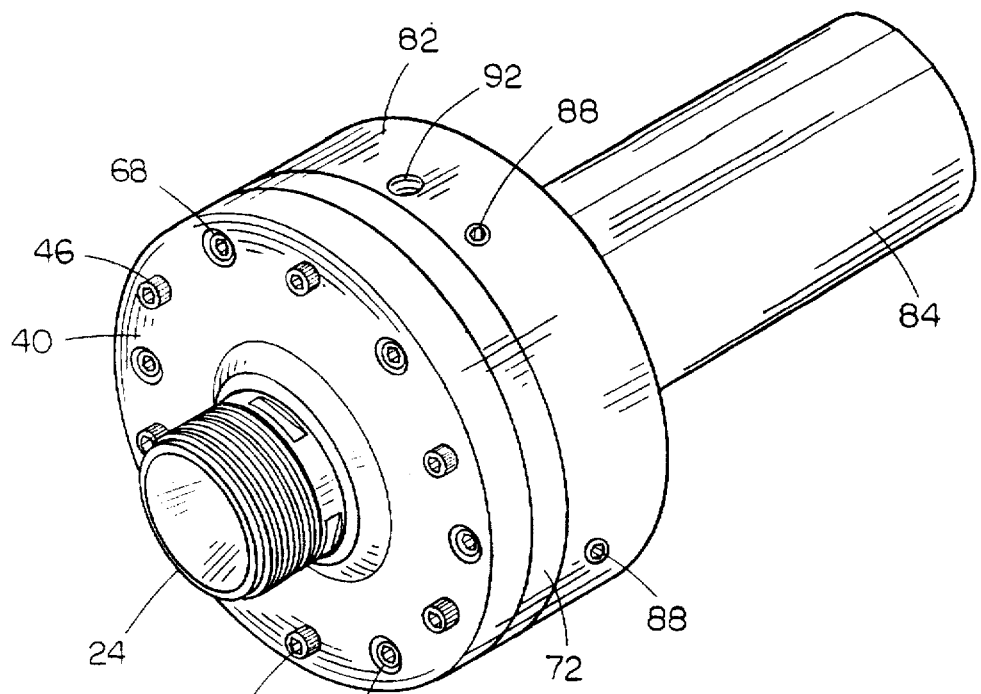
FIG. 2 is a perspective view of the invention with the collet nut and collet removed.
Figure 3:
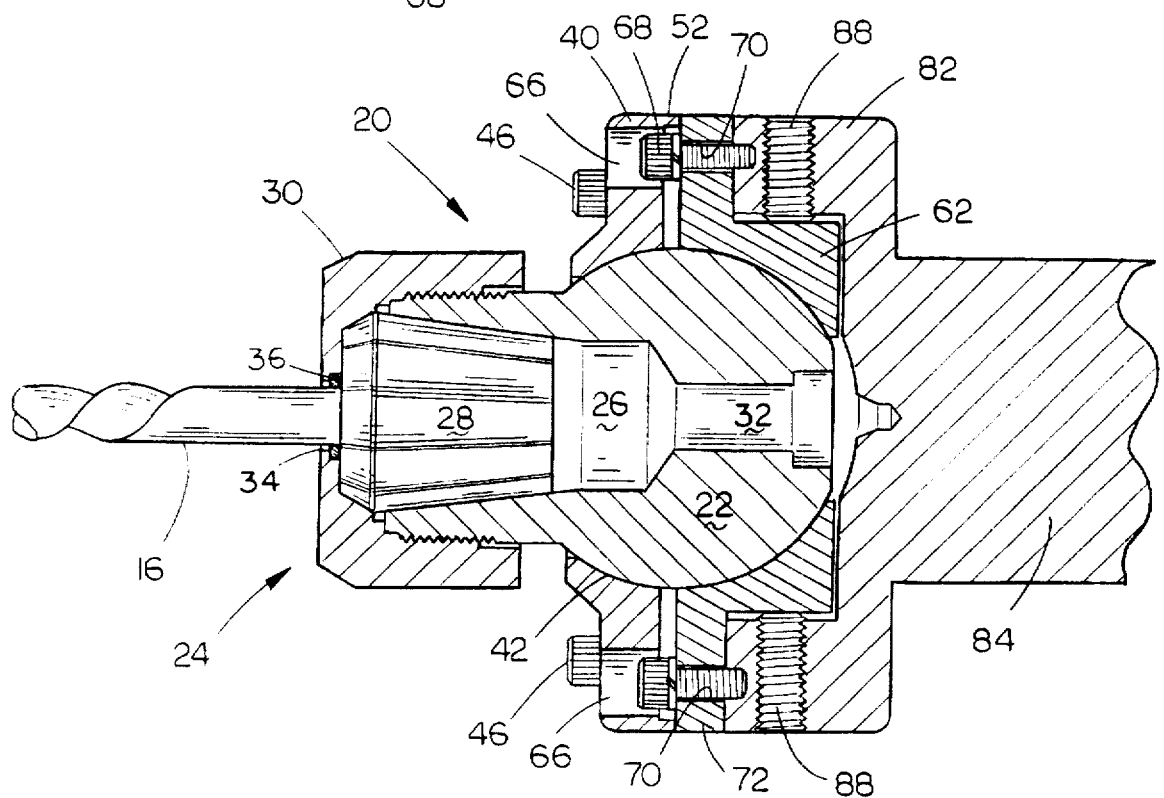
FIG. 3 is a side sectional view of the invention.
Figure 4:
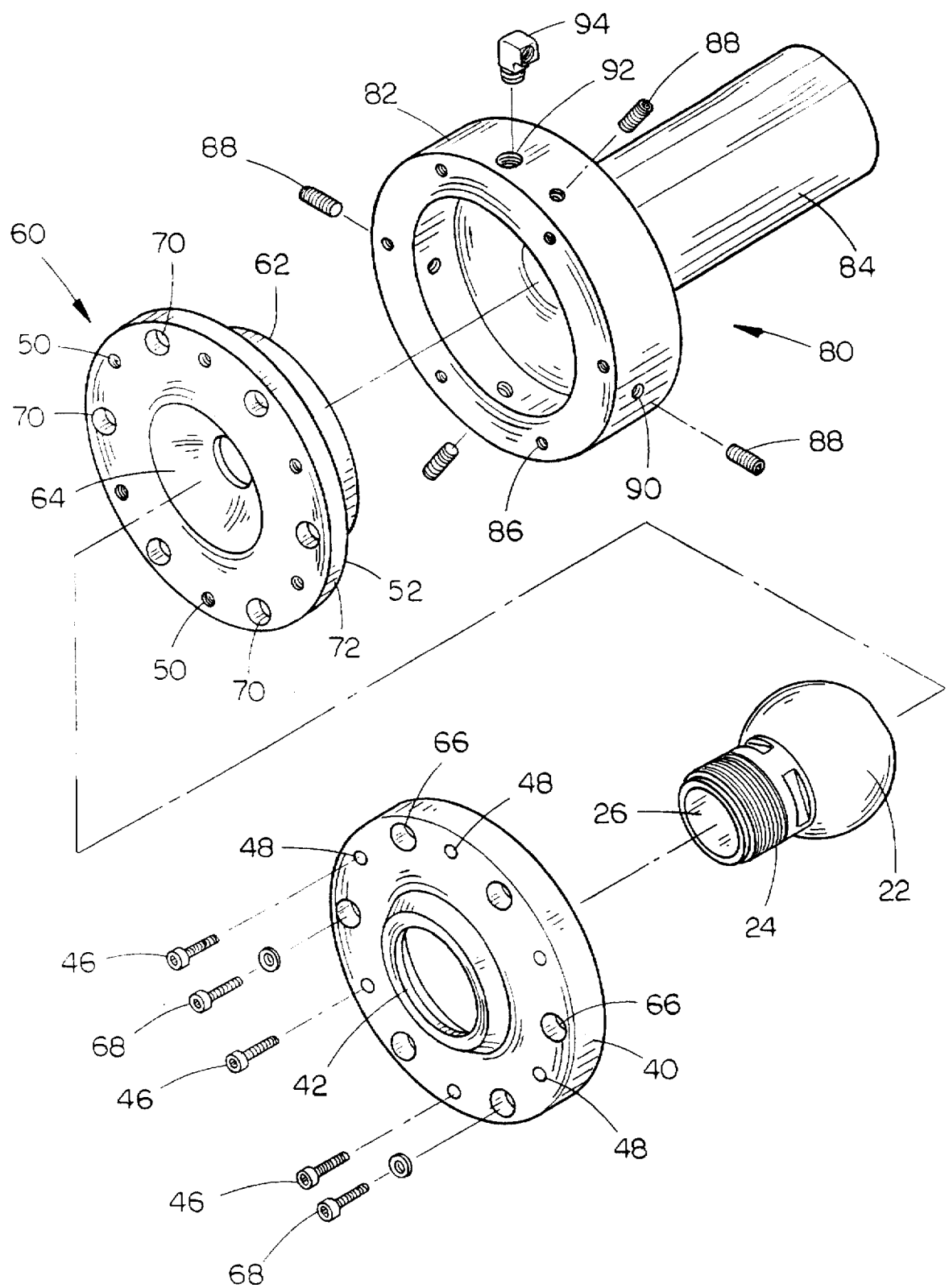
FIG. 4 is an exploded perspective view of the invention.

Referring now to FIGS. 2, 3, and 4, the invention 10 is seen to comprise a ball and socket unit which includes a ball assembly 20, a clamp plate 40, and a socket member 60. The rearwardly extending socket base 62 of the socket member 60 is loosely received within the cup-shaped housing 82 of a base member 80 to allow for radial movement therein. Base member 80 further includes a shank 84 for securement within the tailstock 12 or turret of a CNC lathe.

The ball assembly 20 includes an alignment ball 22 with an integral tool chuck 24 having a collet chamber 26 for receipt of a collet 28 and a threaded collet nut 30 for securement of a drill bit 16. As seen in FIG. 3, the ball 22 has a central bore 32 extending from the collet chamber 26 to the rear of the ball 22 which serves to allow the flow of coolant to the collet 28 and bit 16. The central aperture 34 of the collet nut 30 utilizes a seal ring 36 to prevent leakage of the coolant and direct it through passageways in the drill bit 16.

The alignment ball 22 is movably seated in the concave recess 64 of the socket member 60, and is held therein by a clamp plate 40. The clamp plate 40 has a contoured central aperture 42 for receipt of the forward surface of alignment ball 22, allowing the tool chuck 24 to extend forward from the clamp plate 40. The clamp plate 40 is secured to the socket member 60 by means of six clamp plate bolts 46 which extend through six bores 48 in the clamp plate 40 into six threaded seats 50 in the socket plate 72. The rear face of the clamp plate 40 is provided with a circumferential shoulder 52 (FIG. 3) to provide a small gap between the clamp plate 40 and the socket plate 72.

The clamp plate 40 is further provided with six locking bolt access bores 66 within which pass six locking bolts 68. The six locking bolts 68 loosely extend through six oversized bores 70 in the socket plate 72 and are received within six threaded seats 86 in the face of the cup-shaped housing 82 of the base member 80.

The cup-shaped housing 82 of the base member 80 is provided with four radial alignment bolts 88 extending through four threaded seats 90 spaced at 90 degree intervals around the exterior of the housing 82. The housing 82 is further provided with a coolant inlet 92 and fitting 94.

In operation, the invention 10 is assembled and secured within the tailstock 12 of the lathe 14 with a tool, in this case a drill bit 16, firmly seated within the tool chuck 24. Angular alignment of the drill bit 16 is accomplished by loosening the clamp plate bolts 46 enough to permit rotation of the alignment ball 22 between the clamp plate 40 and socket member 60. When the drill bit 16 is in angular alignment with the working axis of the lathe 14, the clamp plate bolts 46 are tightened to prevent further movement of the alignment ball 22. Radial alignment of the axis of the drill bit 16 with the axis of the lathe is next accomplished by selective adjustment of the radial alignment bolts 88 which are in contact with the socket base 62 of the socket member 60 which loosely extends within the cup-shaped housing 82 of the base member 80. The socket member 60 has freedom of movement in the vertical plane because of the oversized bores 70 through which extend the locking bolts 68. After radial alignment is achieved, the locking bolts 68 are tightened in seats 86 to prevent further movement of the socket base 62 within the housing 82.

Those skilled in the art will recognize that many modifications and variations of the present invention are possible in light of the above teachings. It is therefore to be understood that, within the scope of the appended claims, the invention may be practiced otherwise than as specifically described.

What is claimed is:

1. A tool holder for use in a machine tool which can be adjusted to compensate for angular and radial misalignment of the axis of the tool with respect to the operating axis of the machine tool, comprising:

a base member comprising a cup-shaped housing having a rearwardly extending shank;

means, movably secured to said base member, for angular alignment of a tool carried within said tool holder and movably seated within said cup shaped housing and comprising a ball and socket unit, means for radial alignment of said angular alignment means with respect to said base member;

said ball and socket unit includes a socket member comprising a socket plate with a central, concave recess and a rearwardly extending socket base, a clamp plate comprising a disk having an enlarged central aperture, an alignment ball having a tool chuck extending therefrom and movably positioned between said socket member and said clamp plate, and means for securing said clamp plate to said socket member.

2. The adjustable tool holder as recited in claim 1 wherein said socket base extends to within said cup-shaped housing of said base member and is radially positionable therein.

3. The adjustable tool holder as recited in claim 2 wherein said radial alignment means comprises a plurality of radial alignment bolts extending radially through and to within said cup-shaped housing and in contact with said socket base.

4. A tool holder for use in a machine tool which can be adjusted to compensate for angular and radial misalignment of the axis of the tool with respect to the operating axis of the machine tool, comprising:

a base member comprising a cup-shaped housing with an elongate shank extending rearwardly therefrom;

a ball and socket unit comprising a ball assembly including an alignment ball having a tool chuck extending therefrom, a socket member including a socket plate with a central, concave recess and a rearwardly extending socket base, and a clamp plate having a contoured central aperture, said alignment ball movably contained between said socket member and said clamp plate;

said socket base movably seated within said cup-shaped housing of said base member and having means for radially adjusting said socket base within said cup-shaped housing; and means for securing said clamp plate to said socket plate, and means for securing said socket member to said base member.

5. The adjustable tool holder as recited in claim 4 wherein said rear face of said clamp plate has a circumferential shoulder.

6. The adjustable tool holder as recited in claim 4 wherein said base member further comprises a coolant inlet port.

* * * * *